United States Patent
Mantei et al.

(10) Patent No.: US 9,144,859 B2
(45) Date of Patent: Sep. 29, 2015

(54) METHOD FOR WELDING A SPHERE ONTO A METAL SHEET BY A WELDING CURRENT BETWEEN ELECTRODES

(71) Applicant: Bayerische Motoren Werke Aktiengesellschaft, Munich (DE)

(72) Inventors: Ingo Mantei, Munich (DE); Hannes Vasold, Schweitenkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/751,874

(22) Filed: Jan. 28, 2013

(65) Prior Publication Data

US 2013/0134135 A1 May 30, 2013

Related U.S. Application Data

(63) Continuation of application No. PCT/EP2011/003032, filed on Jun. 18, 2011.

(30) Foreign Application Priority Data

Jul. 29, 2010 (DE) .......... 10 2010 038 616

(51) Int. Cl.
*B23K 9/12* (2006.01)
*B23K 11/00* (2006.01)
(Continued)

(52) U.S. Cl.
CPC ............ *B23K 11/002* (2013.01); *B23K 11/006* (2013.01); *B23K 11/115* (2013.01); *B23K 11/26* (2013.01); *B23K 11/314* (2013.01); *B23K 2201/006* (2013.01); *B23K 2201/18* (2013.01)

(58) Field of Classification Search
CPC .. B23K 11/002; B23K 11/006; B23K 11/115; B23K 11/26; B23K 11/314; B23K 2201/006; B23K 2201/18
USPC ............... 219/50, 56, 56.1, 56.22, 68, 69.11, 219/69.15, 78.01, 79, 80, 103, 104, 107, 219/117.1, 121.11, 136, 137 R
See application file for complete search history.

(56) References Cited

U.S. PATENT DOCUMENTS 1,592,605 A * 7/1926 Ledwinka .................. 219/94
2,380,811 A * 7/1945 Walker ...................... 445/43
(Continued)

FOREIGN PATENT DOCUMENTS

CH        388 486 A     2/1965
CN        101622092 A    1/2010
(Continued)

OTHER PUBLICATIONS

English Language Translation of CH388486.*
(Continued)

*Primary Examiner* — Dana Ross
*Assistant Examiner* — Joseph Iskra
(74) *Attorney, Agent, or Firm* — Crowell & Moring LLP

(57) ABSTRACT

A method is provided for welding in an automated way a sphere onto a metal sheet. The method includes the following steps: providing a sphere; providing a first electrode; picking up the sphere by use of the first electrode; providing a metal sheet; providing a second electrode; pressing the metal sheet and sphere together such that the sphere is pressed against the metal sheet by the first electrode, and the metal sheet is pressed against the sphere by the second electrode; and welding the sphere and the metal sheet together by generating a welding current between the two electrodes.

16 Claims, 1 Drawing Sheet

(51) Int. Cl.
  *B23K 11/11* (2006.01)
  *B23K 11/26* (2006.01)
  *B23K 11/31* (2006.01)

(56) References Cited

U.S. PATENT DOCUMENTS

| | | | |
|---|---|---|---|
| 3,694,614 A | | 9/1972 | Bihler |
| 3,696,614 A | * | 10/1972 | Hartmann et al. |
| 4,795,876 A | * | 1/1989 | Nustede et al. .............. 219/86.1 |
| 6,825,436 B1 | * | 11/2004 | Aoyama et al. ............ 219/117.1 |
| 2002/0084307 A1 | * | 7/2002 | Ruszowski ...................... 228/51 |
| 2009/0001054 A1 | | 1/2009 | Mizuno et al. |
| 2012/0086326 A1 | * | 4/2012 | Niessner et al. .............. 313/141 |
| 2014/0083982 A1 | * | 3/2014 | Quitmeyer ...................... 219/80 |

FOREIGN PATENT DOCUMENTS

| | | |
|---|---|---|
| DE | 33123 | 5/1963 |
| DE | 1 565 876 A | 3/1971 |
| DE | 20 05 094 C3 | 11/1975 |
| DE | 32 32 926 A1 | 3/1984 |
| DE | 692 12 642 T2 | 1/1997 |
| DE | 195 28 273 C1 | 3/1997 |
| EP | 0 097 998 B1 | 1/1984 |
| JP | 8-71767 A | 3/1996 |
| JP | 2005-46896 A | 2/2005 |
| WO | WO 2008/108165 A1 | 9/2008 |

OTHER PUBLICATIONS

German-language Office Action dated Apr. 25, 2012 (five (5) pages).
German-language Office Action dated Mar. 16, 2011 (three (3) pages).
International Search Report dated Sep. 28, 2011 w/English translation (six (6) pages).
English translation of Chinese Office Action dated Aug. 5, 2014 (Seven (7) pages).
English-language translation of Chinese Office Action dated Apr. 22, 2015 (seven (7) pages).

* cited by examiner

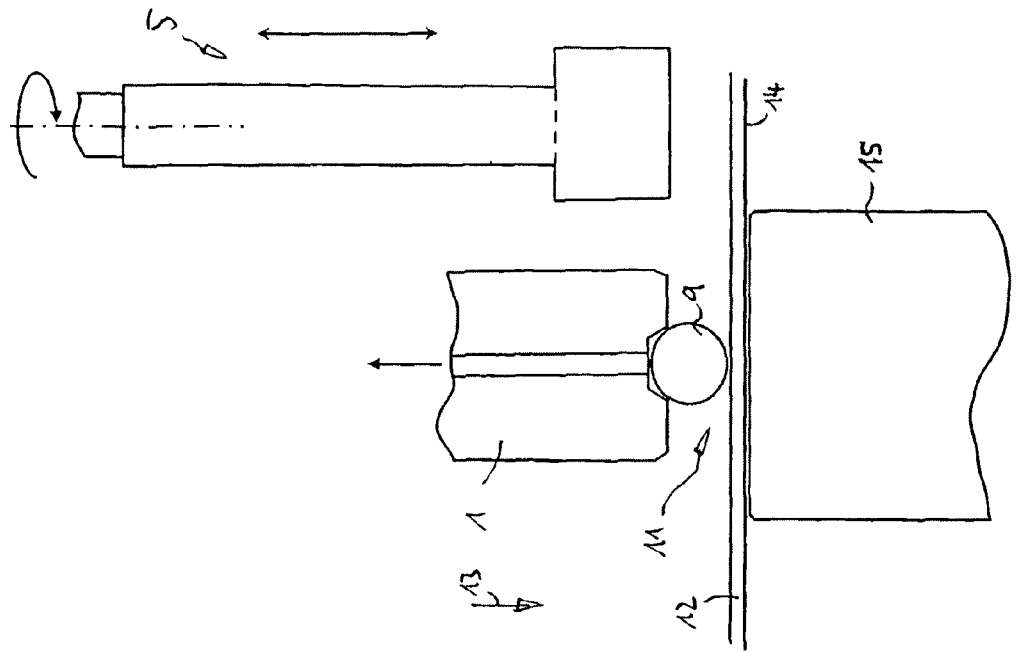
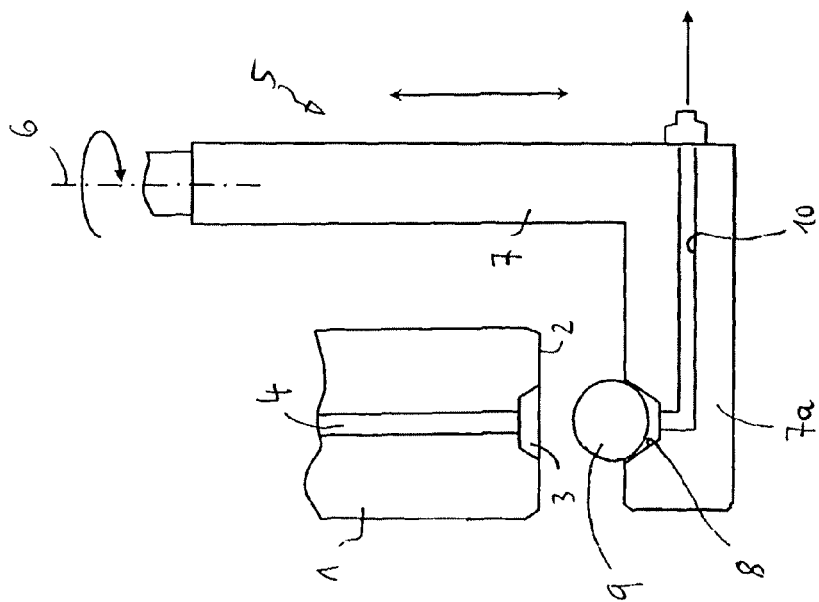

METHOD FOR WELDING A SPHERE ONTO A METAL SHEET BY A WELDING CURRENT BETWEEN ELECTRODES

CROSS REFERENCE TO RELATED APPLICATIONS

This application is a continuation of PCT International Application No. PCT/EP2011/003032, filed Jun. 18, 2011, which claims priority under 35 U.S.C. §119 from German Patent Application No. 10 2010 038 616.2, filed Jul. 29, 2010, the entire disclosures of which are herein expressly incorporated by reference.

SUMMARY AND BACKGROUND OF THE INVENTION

The present invention relates to a method for welding a sphere onto a metal sheet.

The use of spheres or spherical geometry and, additionally or optionally, spheroidal geometry, as joining elements or fastening elements in the construction of motor vehicle bodies is already known from earlier patent applications, some of which are not prior publications. An essential condition for an industrialization of this production method lies in the success of connecting in an automated way the corresponding spherical or spheroidal bodies to a metal sheet as precisely and reliably as possible.

The object of the invention is to provide a method, in particular an automated method, that is configured for connecting a sphere to a metal sheet and that makes it possible to achieve a high degree of positioning accuracy and a high joint strength.

This and other objects are achieved by providing a method for welding a sphere onto a metal sheet, the method comprising the acts of: providing a sphere; providing a first electrode; picking up the sphere by use of the first electrode; providing a metal sheet; providing a second electrode; pressing the metal sheet and sphere together in such a way that the sphere is pressed against the metal sheet by the first electrode and that the metal sheet is pressed against the sphere by use of the second electrode; and welding the sphere and the metal sheet together by generating a welding current between the first and second electrodes.

The basic idea of the invention consists of connecting the sphere to the metal sheet by resistance welding. Resistance welding enables short cycle times and a high degree of positioning accuracy.

This method makes it possible to position the sphere with a high degree of accuracy. An additional advantage lies in the fact that this method produces hardly any welding splatter, as compared to other welding methods, so that this method facilitates a clean, high quality, joint made by welding.

The method according to the invention provides that a sphere that is to be welded onto a metal sheet is picked up by means of a first electrode. In the next step, the metal sheet and the sphere are pressed together. In this context the sphere is pressed against the metal sheet by way of the first electrode, and the metal sheet is pressed from the backside of the metal sheet against the sphere by way of a second electrode, so that the result is a buildup of a defined contact pressure. Finally, the sphere is connected to the metal sheet by welding in a step that lasts a few fractions of a second, in that a welding current, which flows through the metal sheet and the sphere, is generated between the two electrodes.

It can be provided that the welding current is generated for less than one second, in particular for less than 60 ms, and more particularly for less than 10 ms.

According to a further aspect of the invention, the welding current is generated by discharging a capacitor. This feature that has the advantage that a very high welding current can be generated for a short period of time at a comparatively low cost.

Picking up the sphere by use of the first electrode can be achieved by way of a suction device that is provided on the first electrode or is integrated in the first electrode. For this purpose, a face side of the first electrode can have a recess, into which the sphere is sucked by way of the suction device such that at least one side of the sphere that is to be welded still protrudes from the recess. The suction device can be arranged on the first electrode or can be at least partially or totally integrated into the first electrode. The recess can be configured, for example, in the form of a hemisphere, conically, or in any other manner in the form of a cup. What is important is that the recess be configured in such a way that when the sphere is sucked up, the sphere is positioned in a defined manner, i.e. exactly with respect to the first electrode. Preferably, the sphere touches an inner side of the recess along a small circle of the sphere.

In order to automate the picking up of the sphere by use of the first electrode, a feed device can be used. It can be provided that the sphere is held initially at the feed device and then transported into the area of the face side of the first electrode by way of the feed device. As soon as the sphere is situated in the "suction area" of the first electrode, the sphere can be sucked in by the first electrode and, in so doing, can be delivered to the first electrode.

The feed device can be designed as a pivotable feed device. The sphere can be brought into the suction area or, more specifically into the area of the face side of the first electrode, by pivoting the feed device about a pivot axis. Similarly, the feed device can also be provided with a suction device for sucking in and holding the sphere that is to be transported. For this purpose the feed device can have a recess, into which the sphere is sucked, so that the sphere protrudes at least so far out of the recess that it can be sucked in by the suction device of the first electrode.

The above-described method lends itself especially well to welding metal spheres onto the metal sheet of motor vehicle bodies. The spheres can be, for example, steel spheres or aluminum spheres; or the spheres can be spheres made of a different metal or, more specifically, a metal alloy. The above-described method lends itself especially well to an automated process by use of a robot.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1 and 2 are, in each instance, highly simplified representations of an exemplary method according to the invention.

DETAILED DESCRIPTION OF THE DRAWINGS

FIG. 1 shows a first welding electrode 1, which has a conical recess 3 on a face side 2. The welding electrode 1 has a suction channel or, more specifically, a negative pressure channel 4, that extends in the axial direction of the welding electrode and opens or empties into the recess 3. The suction channel or more specifically the negative pressure channel 4 is connected to a suction device (for example, a vacuum pump) that is not depicted in detail herein but is readily understood by one of skill in the art.

Furthermore, a pivotable transport device or, more specifically, a pivotable feed device 5, is shown. This feed device 5 has a pivot arm 7 that is configured in the shape of an L and can be pivoted about a pivot axis 6. The pivot arm 7 has a leg 7a, which projects away from the pivot axis 6; and the leg 7a of the pivot arm has a conical recess 8, into which a sphere 9, which can be made, for example, of steel or any other metal, is placed from above. A negative pressure channel 10 is integrated into the arm 7a; and this negative pressure channel opens into the recess 8. A negative pressure can be generated in the negative pressure channel 10 by use of a suction device that is not illustrated in detail herein but is readily understood by one of skill in the art. As a result, in addition the sphere 9 can also be held on the leg 7a of the pivot arm 7, or more specifically, in the recess 8 of the leg 7a.

In a first step, the feed device 5 is pivoted away from the first electrode 1. In this "loading position" it is possible, for example, for a sphere 9 to be put into the recess 8 of the arm 7a by use of a hose-type conveyor or any other type of conveying device. In order to prevent the sphere from "falling off," the sphere is sucked-in by use of a negative pressure and, thus, secured in position. As soon as the sphere 9 lies on the leg 7a or more specifically in the recess 8, the feed device 5 is pivoted about the pivot axis 6 into the position shown in FIG. 1. In this "delivery position" the sphere 9 may be found in the suction area of the first electrode 1. By shutting off the suction pressure of the feed device and by switching on an adequately high suction pressure at the first electrode 1, the sphere 9 can be sucked into the recess 3 of the first electrode 1 and, in this way, can be delivered to the first electrode 1.

Then, the sphere 9 can be brought into the welding position by the first electrode 1. For this purpose the sphere 9 can be moved up to a weld point 11 on a metal sheet 12, a state that is shown in FIG. 2. At the same time the suction pressure is maintained at the first electrode 1. During this phase the feed device 5 is pivoted into the "loading position" (cf. FIG. 2). Therefore, the feed device can be loaded with another sphere (not illustrated).

Finally, the sphere 9 is aligned and accurately positioned by the first electrode 1 and pressed against the metal sheet 12 in a direction, which is indicated by the arrow 13, by the first electrode 1. A second welding electrode 15 presses from a rear side 14 of the metal sheet 12. If the sphere 9 and the metal sheet 12 are accurately positioned relative to each other and are then pressed together, then a welding current is produced between the two welding electrodes 1, 15. This welding current flows through the sphere, through the contact area of the sphere with the metal sheet and through the metal sheet and, in so doing, causes the sphere 9 to fuse with, or more specifically to be welded together with, the metal sheet 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for welding a sphere onto a metal sheet, the method comprising the acts of:
   picking up the sphere by use of a first electrode;
   pressing a metal sheet and the sphere together, wherein the sphere is pressed against the metal sheet by the first electrode and the metal sheet is pressed against the sphere by a second electrode; and
   generating a welding current between the first and second electrodes to weld the sphere and the metal sheet together, wherein:
   the first electrode comprises a face-side having a recess, an act of applying suction to the sphere being carried out such that upon being sucked into the recess a portion of the sphere that is to be welded protrudes from the recess and another portion of the sphere within the recess contacts an inner side of the recess only linearly about a circular periphery of the sphere so as to position the sphere in a defined manner, and
   the act of generating the welding current produces a point weld between the sphere and the metal sheet such that the sphere substantially maintains a spherical shape suitable for use as a joining element of a joint.

2. The method according to claim 1, wherein the welding current is generated for less than one second.

3. The method according to claim 1, wherein the welding current is generated for less than 60 milliseconds.

4. The method according to claim 1, wherein the welding current is generated for less than 10 milliseconds.

5. The method according to claim 1, wherein the act of generating the welding current is carried out by discharging a capacitor.

6. The method according to claim 4, wherein the act of generating the welding current is carried out by discharging a capacitor.

7. The method according to claim 1, wherein the act of picking up the sphere is carried out by applying suction to the sphere via a suction device assigned to the first electrode.

8. The method according to claim 1, further comprising the acts of:
   initially holding the sphere via a feed device which brings the sphere into a suction area of the face side of the first electrode, wherein the sphere is delivered to the recess of the first electrode via suction by way of the suction device assigned to the first electrode.

9. The method according to claim 8, wherein the bringing of the sphere into the suction area is carried out by pivoting the feed device about a pivot axis.

10. The method according to claim 8, wherein the sphere is initially held at the feed device via suction by way of a suction device assigned to the feed device.

11. The method according to claim 9, wherein the sphere is initially held at the feed device via suction by way of a suction device assigned to the feed device.

12. The method according to claim 8, wherein the feed device has a recess into which the sphere is sucked-in such that the sphere protrudes at least partially out of the recess.

13. The method according to claim 9, wherein the feed device has a recess into which the sphere is sucked-in such that the sphere protrudes at least partially out of the recess.

14. The method according to claim 11, wherein the feed device has a recess into which the sphere is sucked-in such that the sphere protrudes at least partially out of the recess.

15. The method according to claim 1, wherein the metal sheet is a metal sheet for the body of a motor vehicle to be manufactured.

16. The method according to claim 1, wherein the acts of picking up the sphere by use of the first electrode and the generating of the welding current to weld the sphere and the metal sheet together are automatically carried out via a robot.

* * * * *